(12) United States Patent
Bastani et al.

(10) Patent No.: US 10,319,114 B2
(45) Date of Patent: Jun. 11, 2019

(54) FOVEATED COMPRESSION OF DISPLAY STREAMS

(71) Applicant: Google Inc., Mountain View, CA (US)

(72) Inventors: Behnam Bastani, San Jose, CA (US); Carlin Vieri, Menlo Park, CA (US); Haomiao Jiang, Mountain View, CA (US)

(73) Assignee: GOOGLE LLC, Mountian View, CA (US)

( * ) Notice: Subject to any disclaimer, the term of this patent is extended or adjusted under 35 U.S.C. 154(b) by 0 days.

(21) Appl. No.: 15/649,047

(22) Filed: Jul. 13, 2017

(65) Prior Publication Data

US 2019/0019315 A1    Jan. 17, 2019

(51) Int. Cl.
| | |
|---|---|
| *G06T 9/00* | (2006.01) |
| *H04N 19/423* | (2014.01) |
| *H04N 19/174* | (2014.01) |
| *H04N 19/172* | (2014.01) |
| *H04N 19/182* | (2014.01) |
| *H04N 19/44* | (2014.01) |
| *G09G 5/397* | (2006.01) |

(52) U.S. Cl.
CPC .............. *G06T 9/00* (2013.01); *G09G 5/397* (2013.01); *H04N 19/172* (2014.11); *H04N 19/174* (2014.11); *H04N 19/182* (2014.11); *H04N 19/423* (2014.11); *H04N 19/44* (2014.11); *G09G 2310/0297* (2013.01); *G09G 2340/10* (2013.01); *G09G 2350/00* (2013.01); *G09G 2354/00* (2013.01); *G09G 2360/18* (2013.01)

(58) Field of Classification Search
CPC ........... G09G 5/395; G09G 2320/0247; G09G 2340/10; G09G 5/001; H04N 5/44504
See application file for complete search history.

(56) References Cited

U.S. PATENT DOCUMENTS

| 6,496,187 B1 | 12/2002 | Deering et al. |
| 2002/0057279 A1* | 5/2002 | Jouppi .................. G06T 3/4038 345/619 |
| 2002/0167461 A1 | 11/2002 | Bronson |
| 2003/0031369 A1* | 2/2003 | Le Pennec .............. G06T 9/007 382/232 |

(Continued)

OTHER PUBLICATIONS

Walls, et al., "VESA Display Stream Compression," SID Symposium Digest of Technical Papers, Jun. 2014, 5 pages.

(Continued)

*Primary Examiner* — Todd Buttram

(57) ABSTRACT

A processing unit is configured to render first pixels representative of a high-acuity region in the image and second pixels representative of a low-acuity region in the image. A shaper is configured to reorganize the first pixels based on at least one dimension of the low-acuity region. A multiplexer is configured to multiplex the reorganized first pixels and the second pixels to form a display stream. An encoder is configured to compress the display stream for transmission to a display. A decoder configured to decompress the display stream. A demultiplexer is configured to demultiplex the first pixels and the second pixels. Another processing unit is configured to blend the first pixels and the second pixels to form blended pixel values representative of the image for presentation on a screen.

26 Claims, 9 Drawing Sheets

(56) References Cited

U.S. PATENT DOCUMENTS

| | | | | |
|---|---|---|---|---|
| 2004/0227703 A1* | 11/2004 | Lamvik | ............... | G02B 27/0172 |
| | | | | 345/76 |
| 2005/0195373 A1* | 9/2005 | Feigel | ..................... | G06F 3/011 |
| | | | | 353/94 |
| 2014/0063031 A1* | 3/2014 | Brasnett | ................ | G06T 3/0025 |
| | | | | 345/536 |
| 2015/0077613 A1* | 3/2015 | Petilli | ..................... | H04N 5/378 |
| | | | | 348/308 |
| 2016/0026253 A1* | 1/2016 | Bradski | ................ | G02B 27/225 |
| | | | | 345/8 |
| 2018/0137598 A1 | 5/2018 | Spitzer et al. | | |
| 2018/0164592 A1* | 6/2018 | Lopes | ..................... | G02B 27/00 |

OTHER PUBLICATIONS

International Search Report and Written Opinion dated Jul. 11, 2018 for corresponding International Application No. PCT/US2018/027522, 15 pages.

Kong, Hao-Song et al., "ROI-based SNR Scalable JPEG2000 Image Transcoding," Proceedings of SPIE, vol. 5960; Jul. 1, 2005; XP055115265; 10 pages.

Kent, E W. et al., "Pipe (Pipelined Image-Processing Engine)," Journal of Parallel and Distributed Computing, Elsevier, Amsterdam, NL; Feb. 1, 1985; ISSN; 0743-7315; 29 pages. (see pp. 59, 60, 63).

* cited by examiner

FOVEATED COMPRESSION OF DISPLAY STREAMS

BACKGROUND

Foveated rendering exploits the falloff in acuity of the human eye at the visual periphery to conserve power and computing resources that are consumed while generating contents for head mounted displays (HMDs) in augmented reality (AR) and virtual reality (VR) applications. In foveated rendering, the user's central gaze direction is determined, either by the center of system field-of-view or by eye tracking devices. The user's field-of-view is then subdivided into a high-acuity region that surrounds the central gaze direction and one or more lower-acuity regions in the visual periphery. The high-acuity region includes a portion of the field-of-view that is within some angular distance of the central gaze direction. The angular distance from the central gaze direction is also referred to as the eccentricity. The lower-acuity regions include portions of the field-of-view that are at larger eccentricities. For example, the high-acuity region can include a portion of the field-of-view that is within an eccentricity of 5-10°, which corresponds to a portion of the field-of-view that projects to a retinal region in the human eye called the fovea. Content is rendered at high resolution within the high-acuity region, e.g., by rendering the pixels at a resolution corresponding to the native resolution supported by the display. Content in the low-acuity regions at eccentricities larger than 5-10° are rendered at lower resolutions, thereby reducing the power and computing resources needed to render the pixels. The rendered pixels in the low-acuity region can subsequently be upsampled and blended with the pixels in the high-acuity region to generate display pixels at the native resolution of the display, e.g., using well-known interpolation techniques such as bilinear interpolation.

The limited bandwidth of current standard transmission protocols (e.g. DisplayPort) can become a bottleneck for uncompressed image data produced by high-resolution applications. For example, a Ultra High Definition (UHD) display at 60 frames per second with a 30-bit color depth requires a data rate of about 17.3 gigabits per second, which is the current limit of the DisplayPort specification. Higher interface data rates demand more power, can increase the interface wire count, and require more shielding to prevent interference with the device's wireless services. These attributes increase system hardware complexity and weight, which is particularly undesirable in an HMD that is worn by a user. Graphics processing systems can therefore compress the display stream using techniques such as display stream compression (DSC), which is a standardized, visually lossless method of performing inline video compression for standard displays. A DSC encoder includes a frame buffer to store pixel values for an incoming frame, a line buffer to store values of a line of reconstructed pixel values, and a rate buffer to store the output bitstream. Dimensions of the buffers correspond to dimensions of images in the display stream. For example, each line in a buffer can store values for 1280 pixels to correspond to the number of pixels in a line of a 1280×1280 image. A DSC decoder implements a complementary set of buffers.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
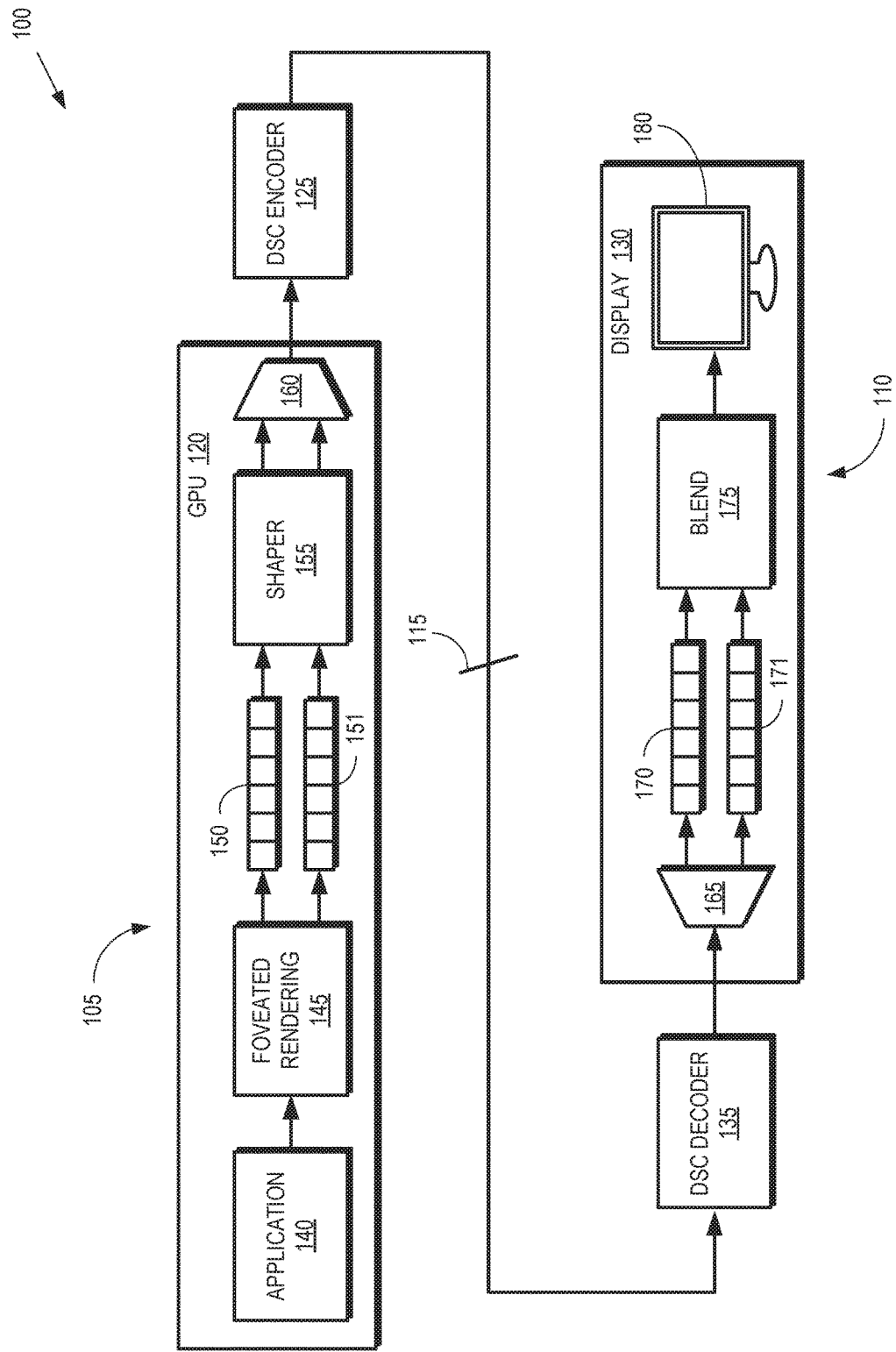
FIG. 1 is a block diagram of a video processing and display system according to some embodiments.

Current implementations of the graphics pipeline perform upscaling of the low-acuity region and blending with the high-acuity region using a system-on-a-chip (SOC) or graphics processing unit (GPU) prior to transmission of the display stream to the display. Consequently, foveated rendering does not necessarily reduce the volume of information transmitted to the display. Foveated transmission can be used to reduce the transmitted volume of information by transmitting the foveated contents in a display stream that includes multiplexed contents of two frame buffers for the high-acuity and low-acuity regions, respectively. The contents the low-acuity region are then upscaled and blended with the contents of the high-acuity region at the display. However, the foveated contents generated by foveated rendering can be in different shapes and structure from those in a conventional display stream. For example, the dimensions of a typical low-acuity region are 1280×1280 pixels, whereas the dimensions of a typical high-acuity region are 100×100 pixels. Conventional DSC is not guaranteed to be visually lossless when applied to a display stream that includes multiplexed high-acuity and low-acuity regions of different dimensions. To the contrary, applying DSC to a display stream formed by arbitrarily multiplexing data from the high-acuity frame buffer and the low-acuity frame buffer is likely to introduce visible errors or artifacts in the uncompressed data.

The preparation time required to multiplex contents of a high-acuity frame buffer and a low-acuity frame buffer for foveated transmission to a display can be reduced, while also reducing buffer sizes and decoding latencies, by reshaping and reorganizing a high-acuity region based on dimensions of a low-acuity region. The reshaped high-acuity region is combined with the low-acuity region to form a display stream. For example, the reshaped high-acuity region can be multiplexed or concatenated with the low-acuity region by placing the high-acuity region on top of the low-acuity regions, in which case the high-acuity region is reshaped to match a width of the low-acuity region. The display stream including the multiplexed high-acuity and low-acuity regions is then encoded, e.g., using a DSC encoder that performs line-by-line compression on predetermined portions of the display stream that are referred to as "slices." In some embodiments, the DSC slice size is tuned to be an integer fraction of a height of the high-acuity region to avoid compression errors across high-acuity and low-acuity borderline. Concatenating the high-acuity region on top of the low-acuity region can be implemented using a relatively simple FPGA design with a buffer size that is equal to or larger than the size of the high-acuity region so that the high-acuity region can be buffered while waiting for a complete line of the low-acuity region to arrive. For another example, the high-acuity and low-acuity regions can be interlaced by partitioning the high-acuity region and low-acuity region into slices having a height that is equal to the DSC slice height. For a given upscaling factors that is applied to the low-acuity regions, a number $s^2$ of high-acuity slices can be interlaced with one low-acuity slice. The remaining low-acuity slices are appended at the end. Slice interlacing can minimize the latency in decoding, but still requires implementing buffers having a size that is equal to or larger than the size of the high-acuity region, e.g., in FPGA. For yet another example, the positions of the high-acuity and low-acuity regions in the display stream can be dynamically reordered on a frame-by-frame basis according to the position of the high-acuity region in each frame. Dynamic reordering requires more processing resources but reduces latency and buffer requirements by putting the lines of the high-acuity region proximate (e.g., just before) corresponding lines in the low-acuity regions.

FIG. 1 is a block diagram of a video processing and display system 100 according to some embodiments. The system 100 includes a processing side 105 and a display side 110 that are separated by an interface 115. Some embodiments of the interfaces 115 operate according to the standards defined by the DisplayPort specification. Each image in a video stream is referred to as a frame. The processing side 105 includes a graphics processing unit (GPU) 120 that generates a two-dimensional array of pixel values that represents a frame of the video. An output stream of bits representing the two-dimensional (2-D) array is then provided to an encoder 125 for compression prior to transmission of the compressed information over the interface 115. Some embodiments of the encoder 125 operate according to the DSC standards. Although the encoder 125 is shown as a separate entity from the GPU 120, some embodiments of the encoder 125 are implemented within the GPU 120. The compressed output stream is conveyed over the interface 115 to a decoder 135 that is configured to decompress the compressed display stream and provide the decompressed display stream to a display 130. Some embodiments of the decoder 135 operate according to the DSC standards. Although the decoder 135 is shown as a separate entity from the display 130, some embodiments of the decoder 135 are implemented within the display 130.

The GPU 120 includes an application 140 that generates information representative of a scene that is to be rendered for display. For example, the application 140 can be a VR or AR application that generates information representative of a VR scene or an AR scene that is to be rendered for display to a user wearing a head mounted device (HMD). In that case, the display 130 is implemented as part of the HMD. Although the application 140 is implemented by the GPU 120, some embodiments of the application 140 are implemented external to the GPU 120. The GPU 120 also includes a foveated rendering block 145 that performs foveated rendering to generate values of pixels representative of a high-acuity region and values of pixels representative of a low-acuity region, as discussed herein. Pixel values representative of the high-acuity region are provided to a high-acuity buffer 150 and pixel values representative of the low-acuity region are provided to a low-acuity buffer 151.

Encoding a display stream formed by arbitrarily multiplexing data from the high-acuity buffer 150 and the low-acuity buffer 151 is likely to introduce visible errors or artifacts in the uncompressed data. The GPU 120 therefore includes a shaper 155 that accesses high-acuity pixels from the high-acuity buffer 150 and low-acuity pixels from the low-acuity buffer 151. The shaper 155 reorganizes the high-acuity pixels based on one or more dimensions of the low-acuity region. Some embodiments of the shaper 155 reorganize lines of pixels from the high-acuity region by concatenating multiple lines so that the number of high-acuity pixels concatenated together is equal to the number of low-acuity pixels in a line of the low-acuity region. For example, if each line of the low-acuity region has 1280 pixels and each line in the high-acuity region has 100 pixels, the shaper 155 concatenates twelve lines of the high-acuity region (and a portion of a $13^{th}$ line) to form a concatenated line. The shaper 155 provides lines of low-acuity pixels from the low-acuity region and concatenated lines of high-acuity pixels from the high-acuity region to a multiplexer 160.

The multiplexer 160 multiplexes the reorganized high-acuity pixels and the low-acuity pixels to form a display stream. Some embodiments of the multiplexer 160 combine the concatenated lines of high-acuity pixels and the lines of low-acuity pixels on a line-by-line basis. For example, the concatenated lines of high-acuity pixels can be appended above, below, to the left, or to the right of the low-acuity pixels, as discussed herein. For another example, the multiplexer 160 can interlace subsets of the concatenated lines of high-acuity pixels with subsets of the lines of low-acuity pixels. Interlacing can be performed statically by interlacing the subsets of the concatenated lines of high-acuity pixels at fixed positions relative to the lines of low-acuity pixels. Interlacing can also be performed dynamically by interlacing the subsets of the concatenated lines of high-acuity pixels at variable positions relative to the lines of low-acuity pixels. The variable position can be determined on a frame-by-frame basis based on relative positions of the high-acuity region and the low-acuity region in each frame of the video. In some embodiments, the concatenated lines of high-acuity pixels and the lines of low-acuity pixels are interlaced by partitioning the high-acuity region and low-acuity region into slices having a height that is equal to the DSC slice height. For a given upscaling factors that is applied to the low-acuity regions, a number $s^2$ of high-acuity slices can be interlaced with one low-acuity slice. The remaining low-acuity slices are appended at the end.

The display 130 includes a demultiplexer 165 that splits the decompressed display stream into a first portion that includes the concatenated lines of high-acuity pixels and a second portion that includes the lines of low-acuity pixels. The concatenated lines of high-acuity pixels are provided to a high-acuity buffer 170 and the lines of low-acuity pixels are provided to a low-acuity buffer 171. Some embodiments of the buffers 170, 171 are implemented using an FPGA to provide a buffer size that is equal to or larger than the size of the high-acuity region so that the high-acuity region can be buffered while waiting for a complete line of the low-acuity region to arrive. For example, FPGA buffers 170, 171 that have a size equal to or larger than the size of the high-acuity region can be used when the concatenated lines of the high-acuity region are buffered on top of the lines of the low-acuity region. The FPGA buffers 170, 171 should also have a size that is equal to or larger than the size of the high-acuity region to support static interlacing. However, in dynamic interlacing, the positions of the high-acuity and low-acuity regions in the display stream are dynamically reordered on a frame-by-frame basis according to the position of the high-acuity region in each frame. Dynamic reordering requires more processing resources but reduces latency and buffer requirements by putting the lines of the high-acuity region proximate (e.g., just before) corresponding lines in the low-acuity regions. The FPGA buffers 170, 171 can therefore be implemented in smaller sizes than the buffer sizes needed for appending or static interlacing.

A blend block 175 combines the values of the high-acuity pixels stored in the high-acuity buffer 170 with values of the low-acuity pixels stored in the low-acuity buffer 171 to generate an image for display on a screen 180. For example, the blend block 175 can upsample the low-acuity pixels to a resolution that corresponds to the (higher) resolution of the high-acuity pixels. The upsampled low-acuity pixels are then blended with the high-acuity pixels to generate values of the pixels that are provided to the screen 180 for display. The blend block 175 can be implemented in hardware, firmware, software, or any combination thereof. For example, the blend block 175 can be implemented as a processor that executes software to perform blending of the upsampled low-acuity pixels with the high-acuity pixels.

Figure 2:
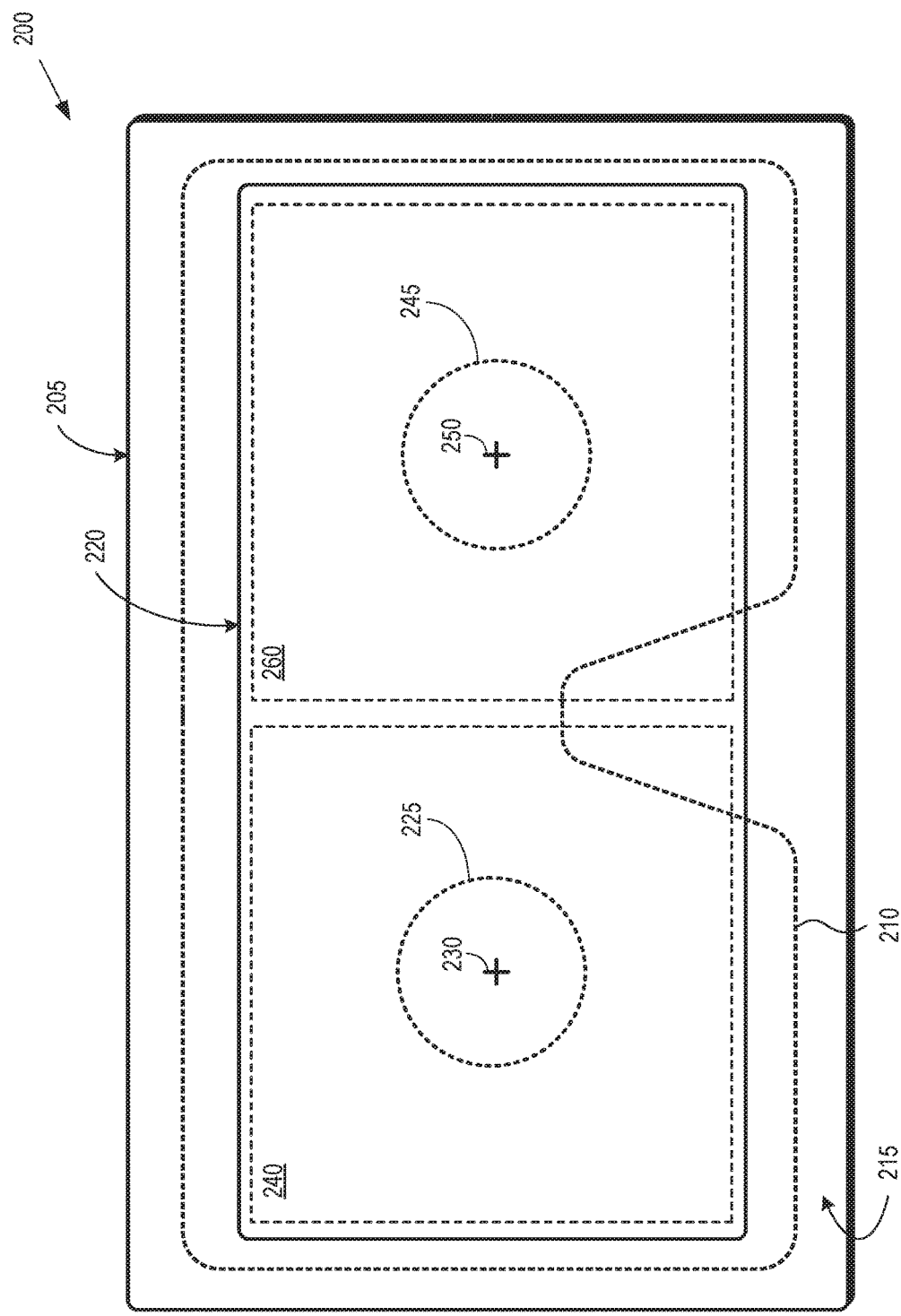
FIG. 2 illustrates a display system that includes an electronic device configured to provide immersive VR or AR functionality according to some embodiments.

FIG. 2 illustrates a display system 200 that includes an electronic device 205 configured to provide immersive VR or AR functionality according to some embodiments. The electronic device 205 is used to implement some embodiments of the display 130 shown in FIG. 1. A back plan view of an example implementation of the electronic device 205 in an HMD form factor in accordance with at least one embodiment of the present disclosure is shown in FIG. 2. The electronic device 205 can be implemented in other form factors, such as a smart phone form factor, tablet form factor, a medical imaging device form factor, a standalone computer, a system-on-a-chip (SOC), and the like, which implement configurations analogous to those illustrated. As illustrated by the back plan view, the electronic device 205 can include a face gasket 210 mounted on a surface 215 for securing the electronic device 205 to the face of the user (along with the use of straps or a harness).

The electronic device 205 includes a display 220 that is used to generate images such as VR images or AR images that are provided to the user. The display 220 is divided into two substantially identical portions, a right portion to provide images to the right eye of the user and a left portion to provide images to the left eye of the user. In other embodiments, the display 220 is implemented as two different displays, one dedicated to each eye. The electronic device 205 implements foveated rendering to present images to the user. The display 220 is therefore subdivided into different regions based on a distance from the user's center of gaze, e.g., the eccentricity. For example, the field-of-view for the user's left eye can be subdivided into a high-acuity region 225 that surrounds a central gaze direction 230. The field-of-view for the user's left eye also includes a low-acuity region 240 in the visual periphery. Similarly, the field-of-view for the user's right eye can be subdivided into a high-acuity region 245 that surrounds a central gaze direction 250 and a low-acuity region 260 in the visual periphery. The central gaze directions 230, 250 can be set equal to the center of a current field-of-view or they can be determined on the basis of eye tracking measurements that detect the central gaze direction of the user's eyes. In some embodiments, more lower acuity regions can be defined for the display 220.

Pixels are rendered at high resolution within the high-acuity regions 225, 245, e.g., by rendering the pixels at a resolution that is equal to the native resolution supported by the display. Pixels in the low-acuity regions 240, 260 are rendered at lower resolutions, thereby reducing the power and computing resources needed to render the pixels. The rendered pixels in the low-acuity regions 235, 240, 255, 260 are subsequently upsampled to generate display pixels at the native resolution of the display, e.g., using well-known interpolation techniques such as bilinear interpolation.

Figure 3:
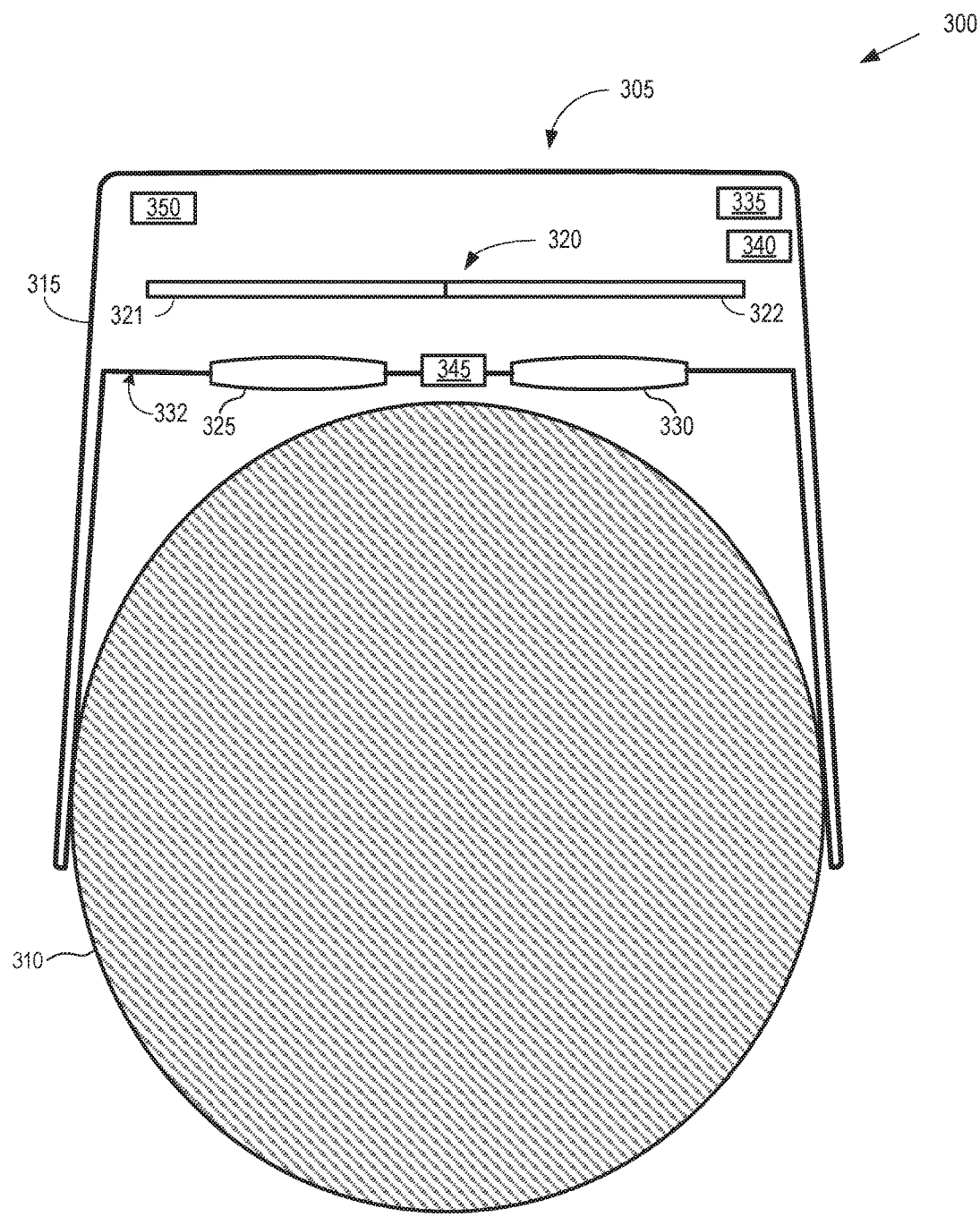
FIG. 3 illustrates a display system that includes an electronic device configured to provide AR or VR functionality via a display to a user wearing the electronic device according to some embodiments.

FIG. 3 illustrates a display system 300 that includes an electronic device 305 configured to provide AR or VR functionality to a user wearing the electronic device 305 via a display according to some embodiments. The electronic device 305 is used to implement some embodiments of the display 130 shown in FIG. 1 and the electronic device 205 shown in FIG. 2. The electronic device 305 is shown in FIG. 3 as being mounted on a head 310 of a user. As illustrated, the electronic device 305 includes a housing 315 that includes a display 320 that generates an image for presentation to the user. The display 320 is implemented using some embodiments of the display 220 shown in FIG. 2. In the illustrated embodiment, the display 320 is formed of a left display 321 and a right display 322 that are used to display stereoscopic images to corresponding left eye and right eye. However, in other embodiments, the display 320 is a single monolithic display 320 that generates separate stereoscopic images for display to the left and right eyes. The electronic device 305 also includes eyepiece lenses 325 and 330 disposed in corresponding apertures or other openings in a user-facing surface 332 of the housing 315. The display 320 is disposed distal to the eyepiece lenses 325 and 330 within the housing 315. The eyepiece lens 325 is aligned with the left eye display 321 and the eyepiece lens 330 is aligned with the right eye display 322.

In a stereoscopic display mode, imagery is displayed by the left eye display 321 and viewed by the user's left eye via the eyepiece lens 325. Imagery is concurrently displayed by the right eye display 322 and viewed by the user's right eye via the eyepiece lens 325. The imagery viewed by the left and right eyes is configured to create a stereoscopic view for the user. Some embodiments of the displays 320, 321, 322 are fabricated to include a bezel (not shown in FIG. 3) that encompasses outer edges of the displays 320, 321, 322. In that case, the lenses 325, 330 or other optical devices are used to combine the images produced by the displays 320, 321, 322 so that bezels around the displays 320, 321, 322 are not seen by the user. Instead, lenses 325, 330 merge the images to appear continuous across boundaries between the displays 320, 321, 322.

Some or all of the electronic components that control and support the operation of the display 320 and other components of the electronic device 305 are implemented within the housing 315. Some embodiments of the electronic device 305 include a processing unit such as a processor 335 and a memory 340 (or other hardware, firmware, or software) that can be used to implement decoders, multiplexers/demultiplexers, buffers, and blend logic such as the decoder 135, the demultiplexer 165, the buffers 170, 171, and the blend block 175 shown in FIG. 1. In some embodiments the workload associated with acquiring actual or virtual images and rendering these images for display on the display 320 can be shared with external processing units such as the GPU 120 shown in FIG. 1. Some embodiments of the electronic device 305 include an eye tracker 345 to track movement of the user's eyes and determine a center of gaze for each eye in real-time. The electronic device 305 also includes one or more motion sensors 350. Examples of motion sensors 350 include accelerometers, gyroscopic orientation detectors, or other devices capable of detecting motion of the electronic device 305.

Figure 4:
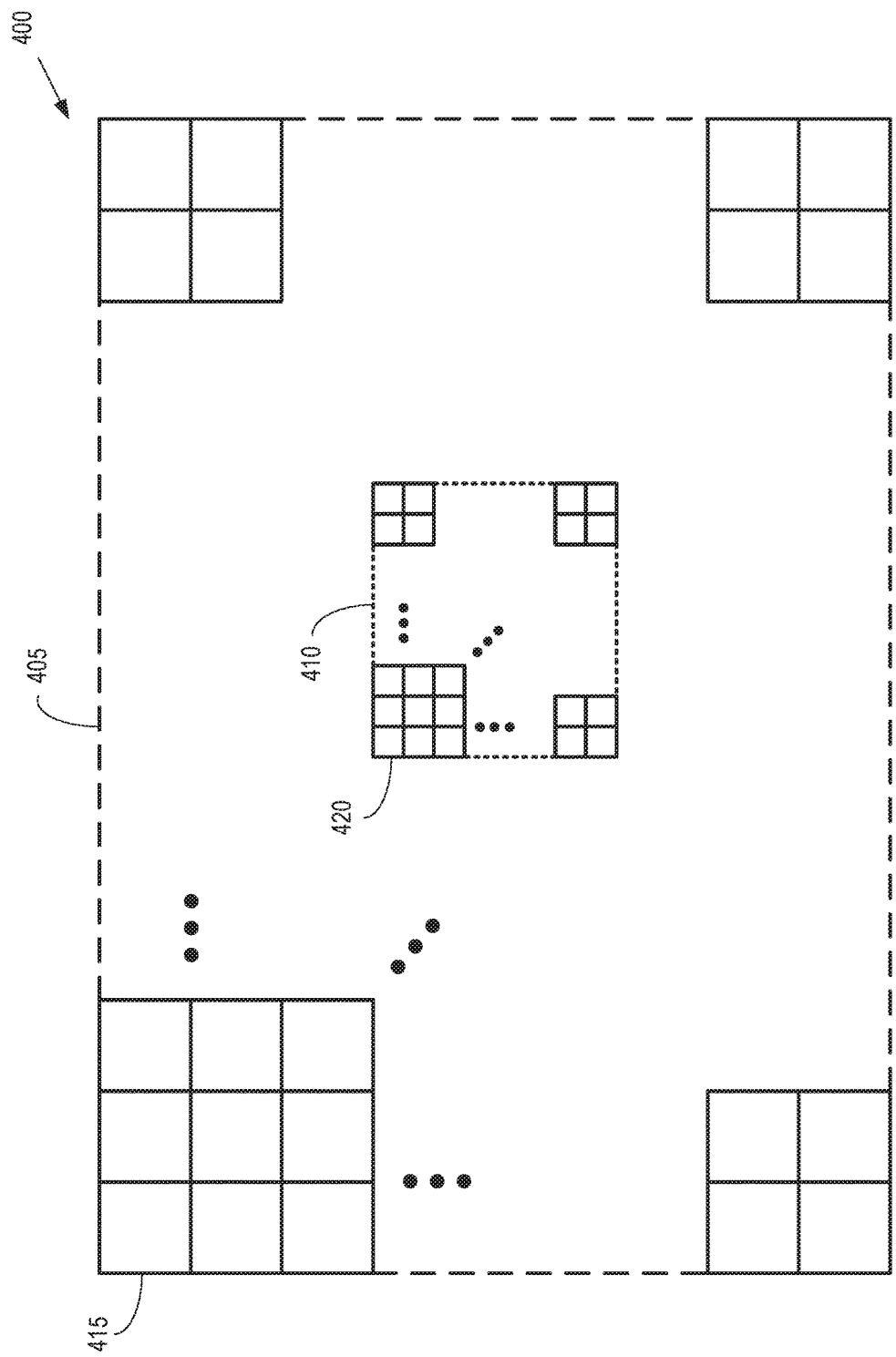
FIG. 4 illustrates a frame of a video that is rendered using foveated rendering according to some embodiments.

FIG. 4 illustrates a frame 400 of a video that is rendered using foveated rendering according to some embodiments. The frame 400 is produced by some embodiments of the foveated rendering block 145 shown in FIG. 1. The frame 400 includes a low-acuity region 405 and a high-acuity region 410. As discussed herein, the relative positions of the low-acuity region 405 and the high-acuity region 410 can be static or dynamic, e.g., the relative positions can change on a frame-by-frame basis in response to changes in an eye gaze direction.

The low-acuity region 405 is represented by values of low-acuity pixels 415 (only one indicated by a reference numeral in the interest of clarity). The resolution of the low-acuity pixels 415 is indicated by the size of the corresponding box. The high-acuity region 410 is represented by values of high-acuity pixels 420 (only one indicated by a reference numeral in the interest of clarity). The resolution of the high-acuity pixels 420 is indicated by the size of the corresponding box. Thus, the resolution of the high-acuity pixels 420 is higher than the resolution of the low-acuity pixels 415. For example, each low-acuity pixel 415 represents a portion of the frame 400 that is nine times larger than the portion of the frame 400 that is represented by each high-acuity pixel 420. The low-acuity pixels 415 can be upsampled to generate values of pixels that are used to represent an image on a display such as some embodiments of the display 130 shown in FIG. 1, the HMD 200 shown in FIG. 2, and the electronic device 305 shown in FIG. 3. For example, the low-acuity pixels 415 can be upsampled by a factor of nine before blending with the high-acuity pixels 420.

Figure 5:
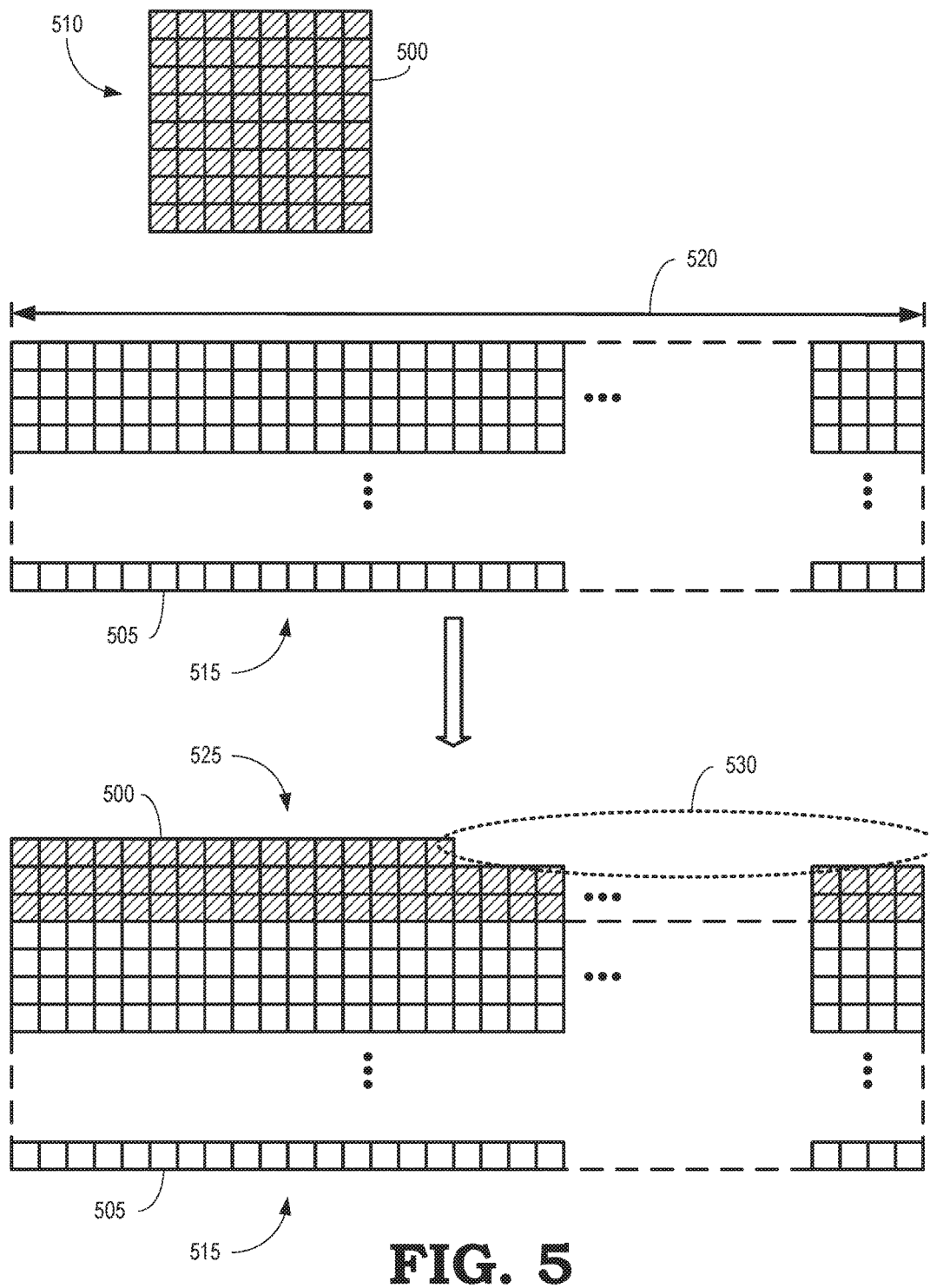
FIG. 5 illustrates high-acuity pixels that represent a high-acuity region in a frame and low-acuity pixels that represent a low-acuity region in the frame according to some embodiments.

FIG. 5 illustrates high-acuity pixels 500 that represent a high-acuity region in a frame and low-acuity pixels 505 that represent a low-acuity region in the frame according to some embodiments. The high-acuity pixels 500 (crosshatched, only one indicated by a reference numeral in the interest of clarity) are organized in a 2-D array 510 that is characterized by dimensions of height and width that correspond to the height and width of the high-acuity region of the frame. For example, the 2-D array 510 can have a height of 100 pixels and a width of 100 pixels. The low-acuity pixels (only one indicated by a reference numeral in the interest of clarity) are organized in a 2-D array 515 that is characterized by dimensions of height and width that correspond to the height and width of the low-acuity region of the frame. For example, the 2-D array 515 can have a height of 1280 pixels and a width of 1280 pixels. The width of the 2-D array 515 is defined by a length 520 of lines of the 2-D array 515.

The high-acuity pixels 500 in the 2-D array 510 are reorganized based on the dimensions of the 2-D array 515 of the low-acuity pixels 505. In some embodiments, the high-acuity pixels 500 are reorganized based on the length 520 of the lines in the 2-D array 515 to form a reshaped array 525 of high-acuity pixels 500. For example, multiple lines of the 2-D array 510 can be concatenated to form a concatenated line that has a length that is equal to the length 520. The concatenated lines are then combined to form the reshaped array 525. In some cases, the number of high-acuity pixels 500 in the 2-D array 510 is not an integer multiple of the number of pixels in the length 520. One of the concatenated lines in the reshaped array 525 is therefore incomplete, as indicated by the dashed oval 530. The incomplete portion 530 of the concatenated line can be filled and using dummy values of pixels. The dummy values can be determined based on values of nearby high-acuity pixels 500, nearby low-acuity pixels 505, or using arbitrary values such as zero padding. The reshaped array 525 is appended to the top of the 2-D array 515.

Figure 6:
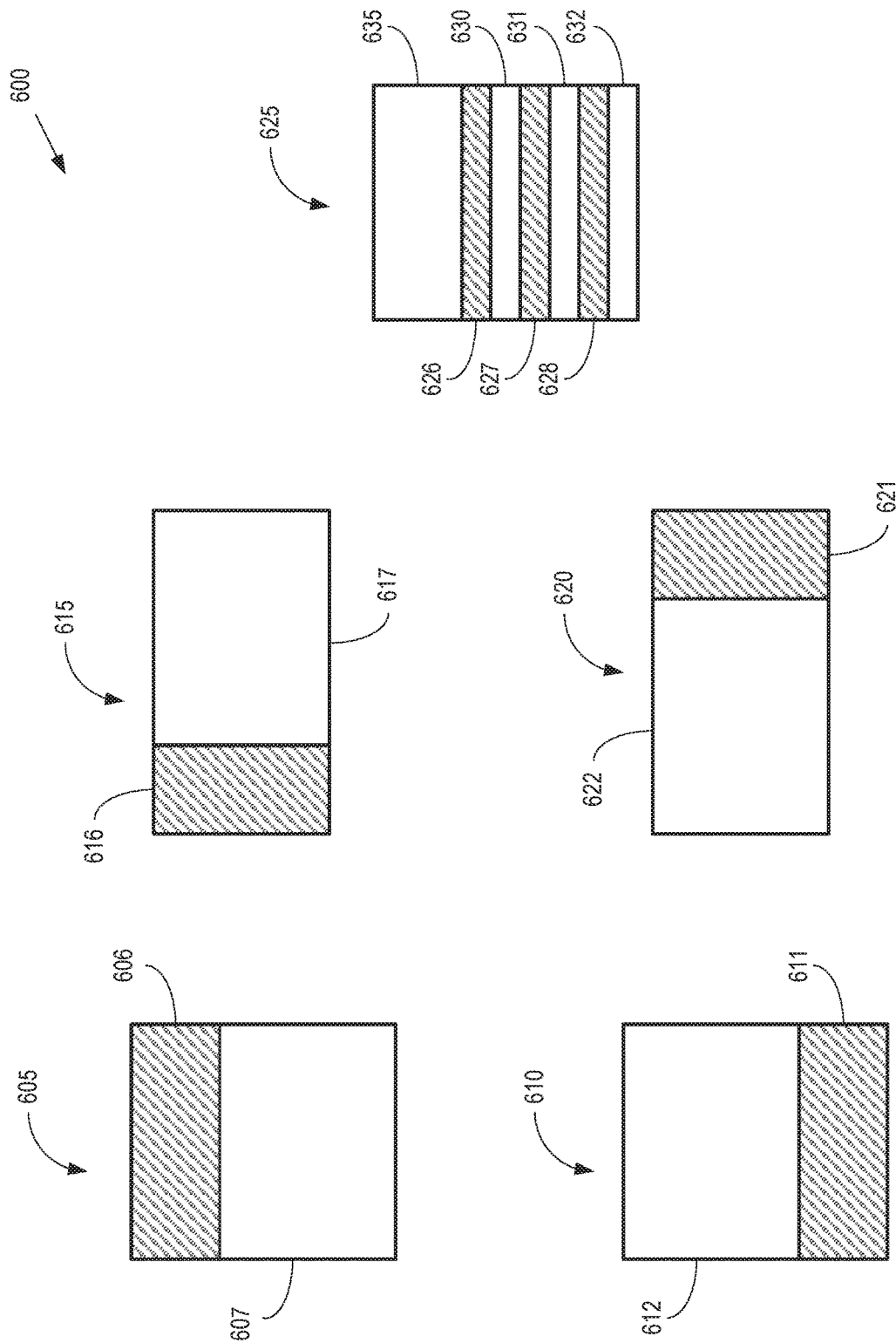
FIG. 6 is a block diagram of a set of combinations of reorganized high-acuity pixels representative of high-acuity regions and low-acuity pixels representative of low-acuity regions according to some embodiments.

FIG. 6 is a block diagram of a set 600 of combinations of reorganized high-acuity pixels representative of high-acuity regions and low-acuity pixels representative of low-acuity regions according to some embodiments. The reorganized high-acuity pixels are represented by crosshatched boxes and the low-acuity pixels are represented by open boxes. The following discussion uses relative terms to indicate the relative positions of the reorganized high-acuity pixels and the low-acuity pixels. The terms are defined relative to a first line of low-acuity pixels, which is located at the bottom of the corresponding box and is oriented in a horizontal direction.

In a first combination 605, reorganized high-acuity pixels 606 are combined with low-acuity pixels 607 by appending the reorganized high-acuity pixels 606 on top of the low-acuity pixels 607. In a second combination 610, reorganized high-acuity pixels 611 are combined with low-acuity pixels 612 by appending the reorganized high-acuity pixels 611 below the low-acuity pixels 612. In a third combination 615, reorganized high-acuity pixels 616 are combined with low-acuity pixels 617 by appending the reorganized high-acuity pixels 616 to the left of the low-acuity pixels 617. In a fourth combination 620, reorganized high-acuity pixels 621 are combined with low-acuity pixels 622 by appending the reorganized high-acuity pixels 621 to the right of the low-acuity pixels 622. In a fifth combination 625, subsets 626, 627, 628 of reorganized high-acuity pixels are interlaced with subsets 630, 631, 632 of low-acuity pixels. After the subsets 626-628 have been interlaced with the subset 630-632, remaining low-acuity pixels 635 are appended on top of the subset 628 of reorganized high-acuity pixels. As discussed herein, interlacing can be static or dynamic.

Figure 7:
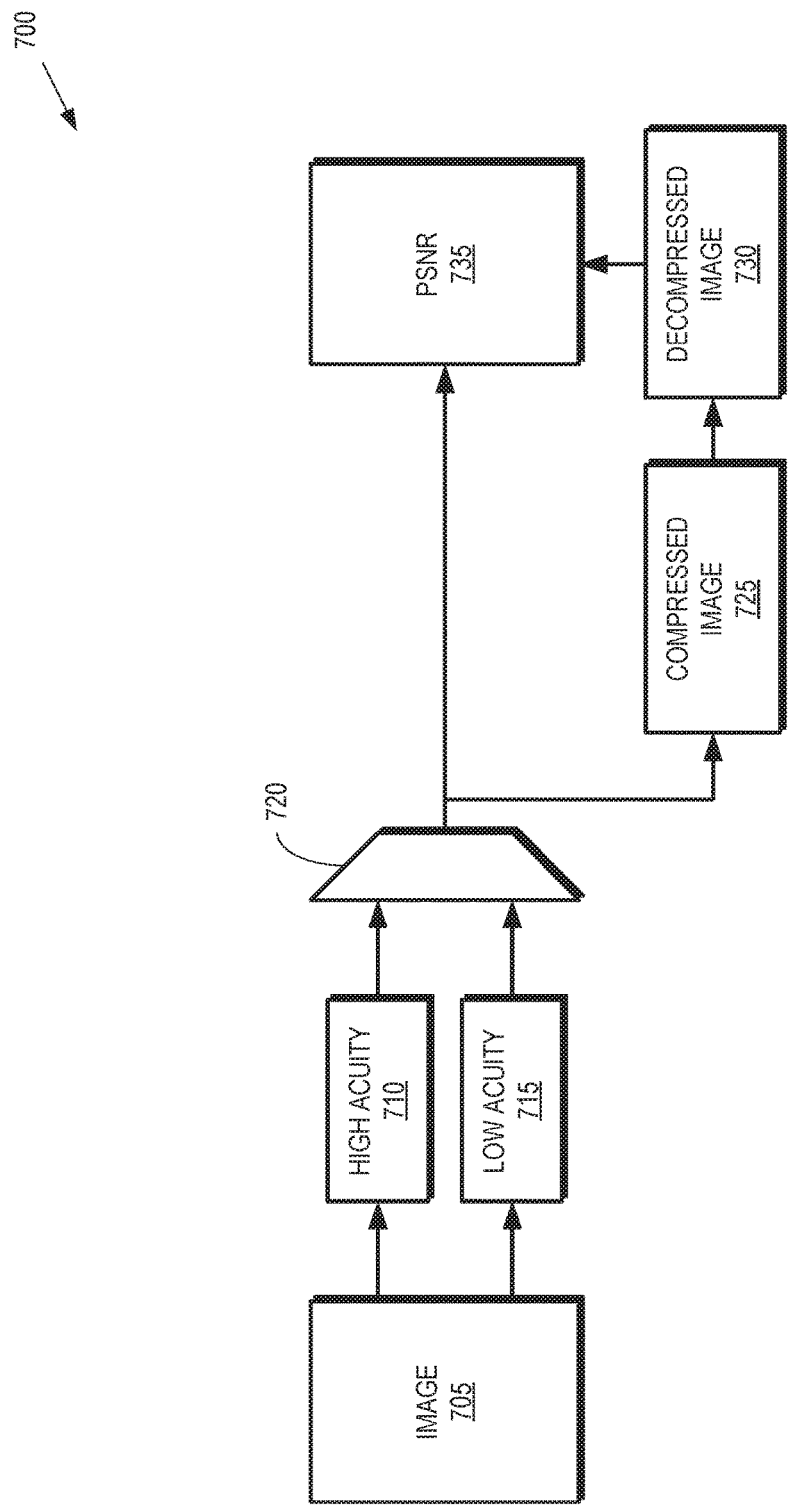
FIG. 7 is a block diagram of an image processing system for comparing the quality of a compressed/decompressed image to an original image according to some embodiments.

FIG. 7 is a block diagram of an image processing system 700 for comparing the quality of a compressed/decompressed image to an original image according to some embodiments. The image processing system 700 receives an image 705, which may be referred to as a "natural" image that represents a scene prior to rendering. Foveated rendering is applied to the image 705 to generate values of pixels 710 representative of a high-acuity region in the image 705 and values of pixels 715 representative of a low-acuity region in the image 705.

A multiplexer 720 is configurable to multiplex the high-acuity pixels 710 and the low-acuity pixels 715 to form a display stream, as discussed herein. A copy of the display stream is compressed to form a compressed image 725. For example, the display stream can be compressed according to DSC standards. The compressed display stream is then decompressed to form a decompressed image 730 that is provided to a peak signal-to-noise ratio (PSNR) detector 735. The original display stream generated by the multiplexer 720 is also provided to the PSNR detector 735 to facilitate comparison of the original and compressed/decompressed images.

In one case, the image 705 is downsampled by a factor of eight in both width and height. A random region of this size is selected from the image 705 and identified as the high-acuity region. Thus, a size of the high-acuity region is set to be the same as a size of the downsampled low-acuity region. Table 1 displays results of a comparison of the original image with the compressed/decompressed image. The results are presented for five different multiplexing configurations: high-acuity region appended to the left of the low-acuity region, appended to the right, appended to the top, appended to the bottom, and interlacing of the high-acuity and low-acuity regions. The top row indicates the mean value of PSNR for each multiplexing configuration and the bottom row indicates the probability that the corresponding multiplexing configuration provides the best performance. The result indicates that each of the methods of appending the high-acuity region to the low-acuity region perform better than interlacing. This result is reasonable because interlacing disrupts the spatial structure of the image 705, which reduces the effectiveness of display stream compression.

TABLE 1

|  | TOP | BOTTOM | LEFT | RIGHT | INTERLACE |
|---|---|---|---|---|---|
| MEAN PSNR | 51.50 | 51.46 | 51.08 | 51.09 | 45.82 |
| BEST PROB | 29% | 28% | 22% | 21% | 0% |

In another case, the high-acuity region has a different size than the downsampled low-acuity region. Multiplexing can therefore be performed by zero padding or reshaping. Zero padding pads zeros to each row of the high-acuity region so that the two regions have the same width. Reshaping is performed by reorganizing the pixels to have a width determined by a width of the low-acuity region, as discussed herein with regard to FIG. 5. Table 2 illustrates a comparison of the two approaches assuming that the high-acuity region is appended to the top of the low-acuity region. Zero padding achieves better image quality for most images, at the cost of sending a larger quantity of useless data. Thus, zero padding may be a preferred choice when the width difference between the high-acuity region and the low-acuity region is small. When the width difference is large, reshaping may be a preferred choice because of the reduced cost of sending useless data.

TABLE 2

|  | ZERO PADDING | RESHAPING |
|---|---|---|
| MEAN PSNR | 51.56 | 50.89 |
| BEST PROBABILITY | 81.7% | 18.3% |

Figure 8:
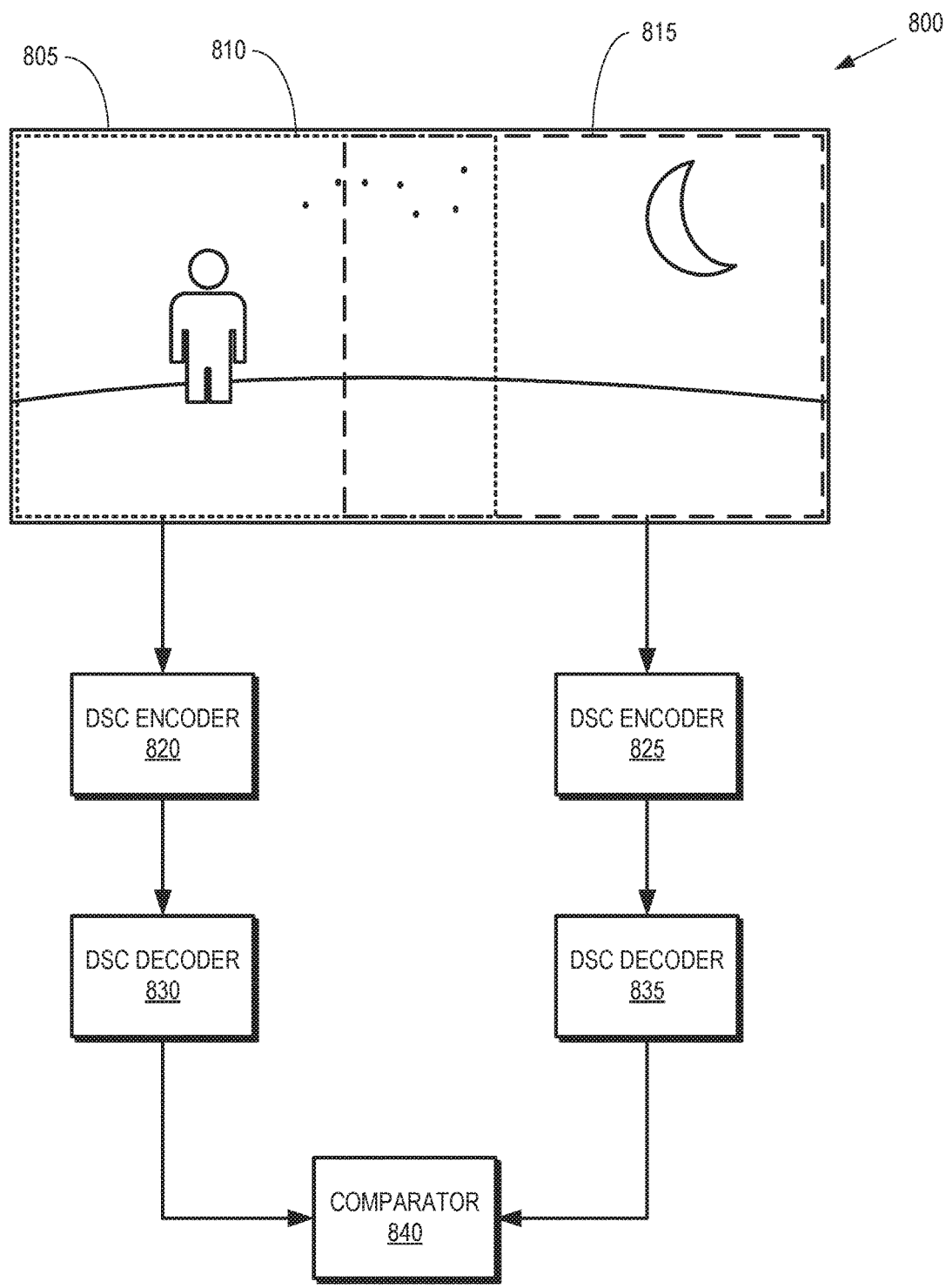
FIG. 8 is a block diagram of an image processing system for compressing and decompressing binocular images according to some embodiments.

FIG. 8 is a block diagram of an image processing system 800 for compressing and decompressing binocular images according to some embodiments. The image processing system 800 receives information representative of an image 805. The information includes a left image 810 and a right image 815 that partially overlap with each other. In the illustrated embodiment, the image 805 is assumed to be at infinite distance and no lens distortion corrections are applied. The binocular field-of-view of the image 805 is 120° and 90° for each eye. Thus, the overlapping region includes the center 60° of the image 805 and the center portion should match exactly for the left and right eyes because the image 805 is assumed to be at infinite distance.

Foveated rendering is performed on the left image 810 and the right image 815 and the information representative of the high-acuity and low-acuity regions for the left image 810 and the right image 815 are combined to form corresponding left and right display streams. For example, values of pixels representative of the high-acuity and low-acuity regions can be appended or interleaved with each other as discussed herein. The left and right display streams are then compressed in DSC encoders 820, 825, respectively. The compressed display streams are provided to DSC decoder is 830, 835, respectively, which perform decompression on the display streams. Images represented by the information in the decompressed left and right display streams are provided to a comparator 840, which compares overlapping portions of the images represented by the decompressed left and right display streams. If the compression/decompression process is perfectly visually lossless, the overlapping portions of the images represented by the decompressed left and right display streams should match exactly.

A comparison of binocular images acquired by an image processing system such as the system 800 has been performed using a natural image data set including approximately 1500 images. The averaged maximum difference has been found to be around 2.5% and the average mean difference is small, primarily due to slicing and large overlap regions. Differences between the left and right regions can increase substantially if the input images are noisy (e.g., due to low light or high ISO).

Some embodiments of the image processing system 800 can also be configured to evaluate the performance of embodiments of the pixel reorganization and compression/decompression techniques described herein for subpixel rendering (SPR). In SPR, the values of pixels are in RGB format at a 66% compression rate. An SPR image can be compressed using DSC by implementing a fake YUV 4:2:2 format to correspond to a native YUV 4:2:2 format that is supported by DSC 1.2. For example, the fake YUV 4:2:2 format can define the G plane as Y, the R plane and U, and the B plane as V. in some cases, rate control parameters can be adjusted to avoid buffer overflow that may occur because the intrinsic properties of YUV and RGB are somewhat different. In some embodiments, the SPR image can be converted to actual YUV 4:2:2 format, although there is no existing standard for this conversion.

Performance of embodiments of the pixel reorganization and compression/decompression techniques is evaluated by computing mean PSNR values on an image data set including approximately 1500 high-resolution natural images with a wide range of scenes. Table 3 shows a comparison of images resulting from application of SPR+DSC to the original images and a comparison of images resulting from application of SPR+DSC to SPR images. The results demonstrate that performing DSC on SPR processed images (as fake YUV) works reasonably well. However, for some natural images, the PSNR can fall to around 30, which indicates that artifacts may be visual in the processed images.

TABLE 3

|  | SPR + DSC vs. Original | SPR + DSC vs. SPR |
|---|---|---|
| AVERAGED PSNR | 36.34 | 42.58 |
| MIN PSNR | 30.15 | 33.20 |

Figure 9:
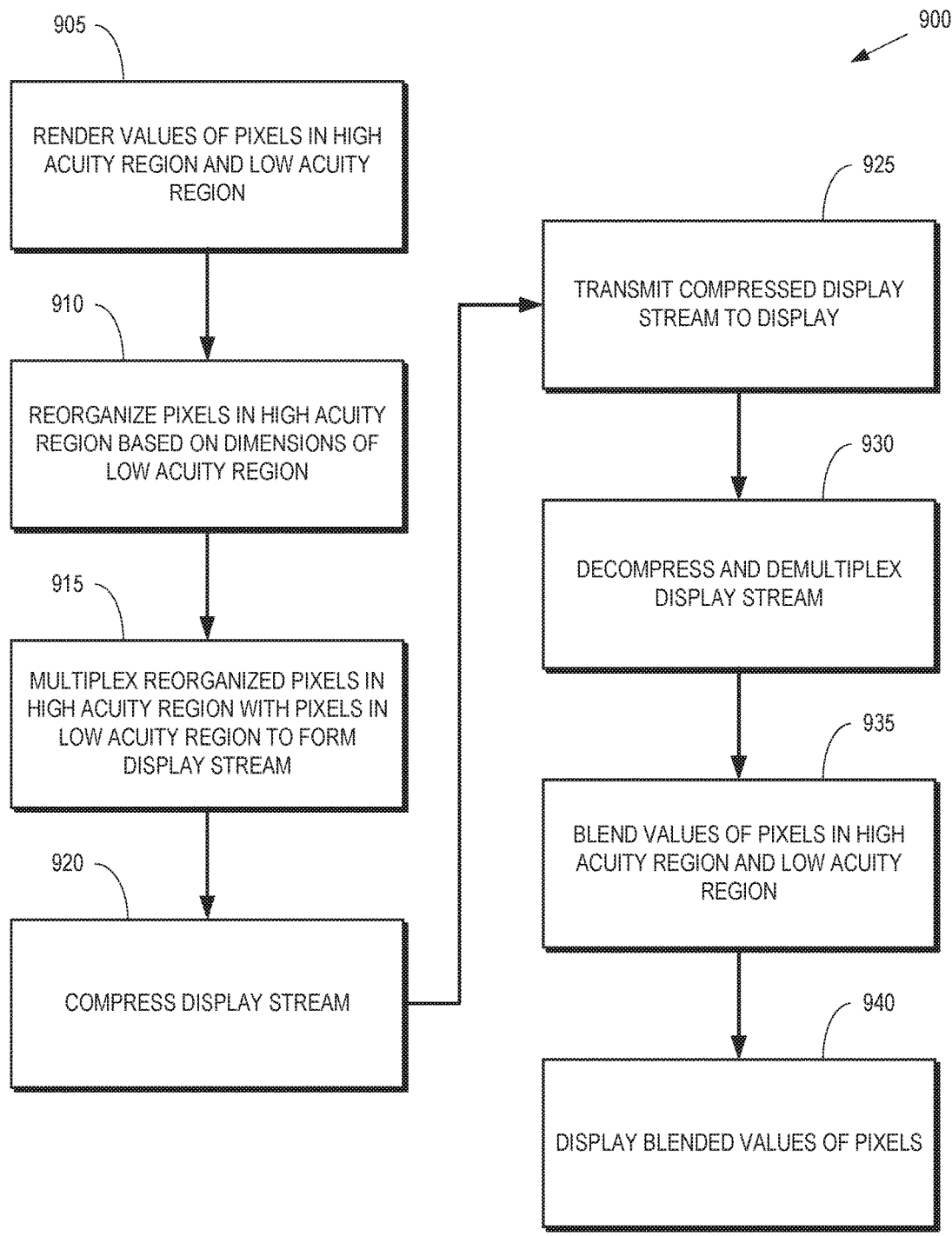
FIG. 9 is a flow diagram of a method of multiplexing reorganized pixels representative of a high-acuity region for combination with pixels representative of a low-acuity region and compressing/decompressing the combined pixels according to some embodiments.

FIG. 9 is a flow diagram of a method 900 of multiplexing reorganized pixels representative of a high-acuity region for combination with pixels representative of a low-acuity region and compressing/decompressing the combined pixels according to some embodiments. The method 900 is implemented in some embodiments of the video processing and display system 100 shown in FIG. 1.

At block 905, a processor (such as the GPU 120 shown in FIG. 1) renders values of pixels in a high-acuity region of an image and a low-acuity region of the image. At block 910, pixels in the high-acuity region are reorganized based on one or more dimensions of the low-acuity region. For example, the pixels in the high-acuity region can be reorganized as illustrated in FIG. 5 and FIG. 6. At block 915, the reorganized high-acuity pixels are multiplexed with the low-acuity pixels to form a display stream. At block 920, the display stream is compressed. For example, the display stream can be compressed according to DSC standards. In some embodiments, the operations in blocks 905, 910, 915, 920 are performed on a processor side of an interface, such as the processor side 105 of the interface 115 shown in FIG. 1.

At block 925, the compressed display stream is transmitted to a display side. In some embodiments, the compressed display stream is transmitted over the interface 115 to the display side 110 shown in FIG. 1.

At block 930, the display stream is decompressed and demultiplexed to generate values of the high-acuity pixels and the low-acuity pixels, which are stored in corresponding buffers such as the buffers 170, 171 shown in FIG. 1. At block 935, values of the high-acuity pixels and low-acuity pixels are blended. In some embodiments, the low-acuity pixels are upsampled and blended with the high-acuity pixels to generate display pixels at a native resolution of the display, e.g., using well-known interpolation techniques such as bilinear interpolation. At block 940, the display pixels are displayed on a screen such as the screen 180 shown in FIG. 1. In some embodiments, the operations in blocks 930, 935, 940 are performed on a display side of an interface, such as the display side 110 of the interface 115 shown in FIG. 1.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
accessing first pixels from a first buffer of an electronic device, wherein values of the first pixels represent a high-acuity region in an image and wherein the first pixels are organized as a set of first pixel lines in the first buffer;
accessing second pixels from a second buffer of the electronic device, wherein values of the second pixels represent a low-acuity region in the image and wherein the second pixels are organized as a set of second pixel lines in the second buffer;
reorganizing the first pixels based on at least one dimension of the low-acuity region, wherein reorganizing the first pixels comprises concatenating subsets of the set of first pixel lines to form modified first pixel lines including a number of first pixels that is equal to a number of second pixels in the second pixel lines;
multiplexing the reorganized first pixels and the second pixels to form a display stream; and
compressing the display stream for transmission to a display.

2. The method of claim 1, wherein multiplexing the reorganized first pixels and the second pixels comprises combining the modified first pixel lines and the second pixel lines on a line-by-line basis.

3. The method of claim 2, wherein combining the modified first pixel lines and the second pixel lines on the line-by-line basis comprises concatenating the modified first pixel lines and the second pixel lines.

4. The method of claim 3, wherein concatenating the modified first pixel lines and the second pixel lines comprises appending the modified first pixel lines above, below, to the left, or to the right of the second pixel lines.

5. The method of claim 2, wherein combining the modified first pixel lines and the second pixel lines on the line-by-line basis comprises interlacing the modified first pixel lines and the second pixel lines on a line-by-line basis.

6. The method of claim 5, wherein interlacing the modified first pixel lines and the second pixel lines comprises partitioning the modified first pixel lines and the second pixel lines into slices having a height that corresponds to a slice height used to compress the display stream.

7. The method of claim 6, wherein interlacing the modified first pixel lines and the second pixel lines comprises interlacing a number $s^2$ of slices of the modified first pixel lines with each slice of the second pixel lines, wherein s represents an upscaling factor that is applied to the low-acuity region.

8. The method of claim 5, wherein interlacing the modified first pixel lines and the second pixel lines comprises statically interlacing the modified first pixel lines at a fixed position relative to the second pixel lines.

9. The method of claim 5, wherein interlacing the modified first pixel lines and the second pixel lines comprises dynamically interlacing the modified first pixel lines at a variable position relative to the second pixel lines, wherein the variable position is determined based on relative positions of the high-acuity region and the low-acuity region in the image.

10. The method of claim 1, further comprising:
decompressing the display stream;
demultiplexing the display stream to generate the reorganized first pixels and the second pixels; and
reconstructing an original configuration of the first pixels from the reorganized first pixels.

11. A method comprising:
accessing first pixels from a first buffer of an electronic device, wherein values of the first pixels represent a high-acuity region in an image;
accessing second pixels from a second buffer of the electronic device, wherein values of the second pixels represent a low-acuity region in the image;
reorganizing the first pixels based on at least one dimension of the low-acuity region;
multiplexing the reorganized first pixels and the second pixels to form a display stream; and
compressing the display stream for transmission to a display, wherein compressing the display stream comprises compressing slices of the display stream on a line-by-line basis, wherein each slice of the display stream includes a number of lines that is an integer fraction of a total number of the modified first pixel lines.

12. The method of claim 10, further comprising:
blending the original configuration of the first pixels and the second pixels to form blended pixel values representative of the image; and
displaying the blended pixel values on a screen.

13. An apparatus comprising:
a processing unit configured to render first pixels representative of a high-acuity region in an image and second pixels representative of a low-acuity region in the image;
a first buffer configured to store values of the first pixels rendered by the processing unit, wherein the first pixels are organized as a set of first pixel lines in the first buffer;
a second buffer configured to store values of the second pixels rendered by the processing unit, wherein the second pixels are organized as a set of second pixel lines in the second buffer;
a shaper configured to reorganize the first pixels based on at least one dimension of the low-acuity region, wherein the shaper is configured to access the values of the first pixels from the first buffer and to access the values of the second pixels from the second buffer and configured to reorganized the first pixels by concatenating subsets of the set of first pixel lines to form modified first pixel lines including a number of first pixels that is equal to a number of second pixels in the second pixel lines;
a multiplexer configured to multiplex the reorganized first pixels and the second pixels to form a display stream; and
an encoder configured to compress the display stream for transmission to a display.

14. The apparatus of claim 13, wherein the multiplexer is configured to combine the modified first pixel lines and the second pixel lines on a line-by-line basis.

15. The apparatus of claim 14, wherein the multiplexer is configured to concatenate the modified first pixel lines and the second pixel lines.

16. The apparatus of claim 15, wherein the multiplexer is configured to append the modified first pixel lines above, below, to the left, or to the right of the second pixel lines.

17. The apparatus of claim 14, wherein the multiplexer is configured to interlace the modified first pixel lines and the second pixel lines on a line-by-line basis.

18. The apparatus of claim 17, wherein the multiplexer is configured to interlace the modified first pixel lines and the second pixel lines into slices having a height that corresponds to a slice height used to compress the display stream.

19. The apparatus of claim 18, wherein the multiplexer is configured to interlace a number $s^2$ of slices of the modified first pixel lines with each slice of the second pixel lines, wherein s represents an upscaling factor that is applied to the low-acuity region.

20. The apparatus of claim 17, wherein the multiplexer is configured to statically interlace the modified first pixel lines at a fixed position relative to the second pixel lines.

21. The apparatus of claim 17, wherein the multiplexer is configured to dynamically interlace the modified first pixel lines at a variable position relative to the second pixel lines, wherein the variable position is determined based on relative positions of the high-acuity region and the low-acuity region in the image.

22. An apparatus comprising:
a processing unit configured to render first pixels representative of a high-acuity region in an image and second pixels representative of a low-acuity region in the image;
a shaper configured to reorganize the first pixels based on at least one dimension of the low-acuity region;

a multiplexer configured to multiplex the reorganized first pixels and the second pixels to form a display stream; and an encoder configured to compress the display stream for transmission to a display, wherein the encoder is configured to compress slices of the display stream on a line-by-line basis, wherein each slice of the display stream includes a number of lines that is an integer fraction of a total number of the modified first pixel lines.

23. An apparatus comprising:

a decoder configured to decompress a display stream formed of first pixels having values representative of a high-acuity region in an image and second pixels having values representative of a low-acuity region in the image, wherein the first pixels are reorganized from an array having a first dimension to an array having a corresponding second dimension different than the first dimension prior to being compressed based on at least one dimension of the low-acuity region;

a demultiplexer configured to demultiplex the first pixels and the second pixels; and a processing unit configured to blend the first pixels and the second pixels to form blended pixel values representative of the image, wherein the processing unit is configured to reconstruct the first pixels from the array having the second dimension into the array having the first dimension.

24. The apparatus of claim 23, wherein the processing unit is configured to blend the first pixels in the array having the first dimension and the second pixels to form the blended pixel values representative of the image.

25. The apparatus of claim 23, further comprising:

a first buffer configured to store values of the first pixels received from the demultiplexer, wherein the processing unit is configured to access the first pixels from the first buffer; and a second buffer configured to store values of the second pixels received from the demultiplexer, wherein the processing unit is configured to access the second pixels from the second buffer.

26. The apparatus of claim 23, further comprising:

a screen configured to present the image based on the blended pixel values.

* * * * *

UNITED STATES PATENT AND TRADEMARK OFFICE
CERTIFICATE OF CORRECTION

PATENT NO. : 10,319,114 B2
APPLICATION NO. : 15/649047
DATED : June 11, 2019
INVENTOR(S) : Behnam Bastani, Carlin Vieri and Haomiao Jiang Page 1 of 1

It is certified that error appears in the above-identified patent and that said Letters Patent is hereby corrected as shown below:

In the Claims

At Column 14 Line 19, correct "configured to reorganized the" to be --configured to reorganize the--

Signed and Sealed this
Nineteenth Day of November, 2019

Andrei Iancu
*Director of the United States Patent and Trademark Office*